July 10, 1951  M. C. DETWILER  2,559,853

TRACTOR SEAT MOUNTING

Filed April 26, 1945

INVENTOR.
MERLE C. DETWILER
BY
Oberlin & Limbach
ATTORNEYS

Patented July 10, 1951

2,559,853

UNITED STATES PATENT OFFICE 2,559,853

TRACTOR SEAT MOUNTING

Merle C. Detwiler, New Enterprise, Pa., assignor to The Fate-Root-Heath Company, Plymouth, Ohio, a corporation of Ohio Application April 26, 1945, Serial No. 590,406

2 Claims. (Cl. 155—51)

This invention relates to tractor seat mountings and more particularly to the mounting means for seats on tractors such as are used for agricultural and industrial purposes.

One of the inconveniences and discomforts incidental to the operation of tractors of this character is that they are many times called upon to traverse a relatively rough terrain causing a severe jolting to the operator. In other instances when the tractor passes over a substantial obstruction or encounters a substantial depression, the operator is many times in danger of being thrown from the machine. I am aware of the fact that it has been proposed to overcome this difficulty by placing a flexible strut underneath the seat. However, in such arrangements the strut in order to be effective must be substantially stiff. This results in a hard riding seat adding to the discomfort of the operator.

It is a principal object of my invention to provide a tractor seat support which gives a relatively smooth ride under normal conditions but which is effective, however, to prevent transmission to the operator's body of severe jolts to which the frame of the tractor may be subjected.

It is a further object of my invention to provide a structure of the character described which may be relatively simple to manufacture, may be produced at a relatively low cost, and is adaptable to a wide variety of tractor frames.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
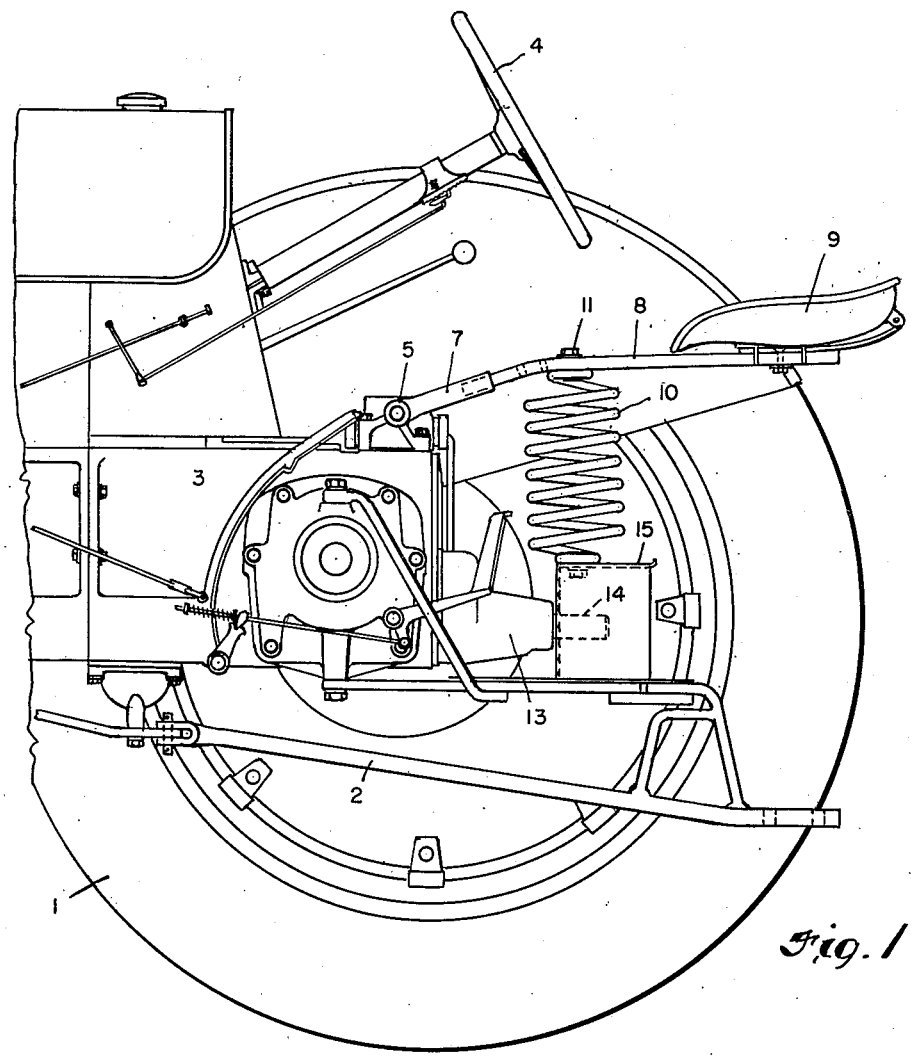
Figure 2:
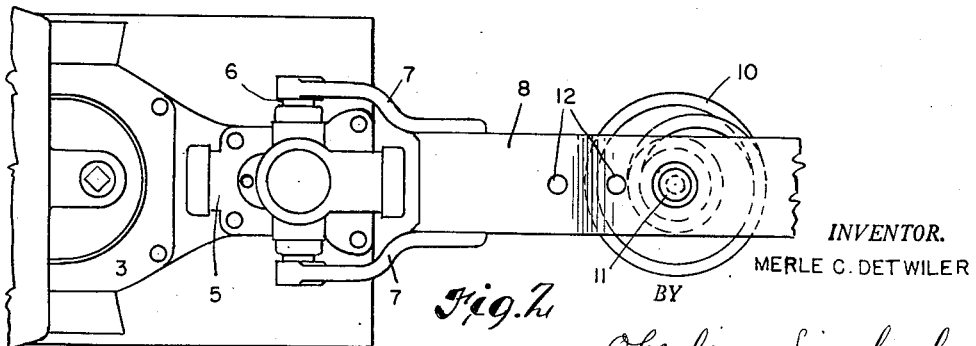

In said annexed drawing:

Fig. 1 is a side elevation of the rear end of a tractor (with the near wheel removed) showing one embodiment of my invention; and Fig. 2 is a plan view of those features of the structure illustrated in Fig. 1 with which my invention is concerned.

Referring now more specifically to the drawing and more especially to Fig. 1, my invention is here illustrated associated with a conventional four-wheel tractor, only the rear portion of which is shown in the drawing. The tractor illustrated includes the conventional rear wheel 1, draw bar 2, transmission housing 3, steering wheel 4, and numerous other illustrated parts which being in no way related to my invention will not be described in greater detail.

The apparatus which includes the novel features of the present invention comprises a shock absorber generally indicated at 5 and which is mounted for purposes of convenience on the upper side of the transmission and differential housing 3. The shock absorber 5 is of conventional design such as is used on present-day automobiles and similar vehicles and is preferably of the type in which fluid friction is employed for the purpose of damping the reciprocation of a moving part. There are a number of shock absorbers of this kind on the market. The type of structure which may be employed is like that illustrated for example in U. S. Patent No. 2,321,818.

The shock absorber 5 illustrated in the drawing is of the type including a transversely extending shaft 6 to which are keyed lever arms 7. It will be noted that the shock absorber is effective for the purpose of damping the reciprocation in a vertical plane of the arms 7 and accordingly any devices attached thereto.

Secured to the arms 7 as by welding or otherwise is the forward end of a beam 8, to the rear end of which there is secured a conventional seat 9.

The beam 8 is supported intermediately of its ends by means of a compression spring 10. The spring 10 is connected to the beam 8 by means of a bolt 11. By providing a plurality of spaced holes such as 12 longitudinally of the beam 8, the spring 10 may be secured to the beam at any one of a number of selected positions.

The lower end of the spring 10 may be mounted on any suitable portion of the tractor frame or any appropriate bracket provided for that purpose. In the tractor illustrated in the drawing there is a rear power take-off mechanism 13 from which projects a rear power take-off shaft 14. In the interests of safety, the shaft 14 is preferably positioned in a housing such as 15 which laterally encloses the shaft but which being open at its rear face permits access to the shaft.

In the embodiment of my invention illustrated in the drawing I have shown the spring 10 mounted on and secured to the housing 15. By utilizing this arrangement, the operator is precluded from removing the housing 15 during the normal operation of the tractor, thus insuring that this safety device will always be in place when the tractor is being used.

As previously indicated the shock absorber 5 is of such construction that it in itself does not function to support the beam 8 in the position illustrated in the drawing. The primary function of the shock absorber is for the purpose of damping sudden oscillations or reciprocations of the beam 8 in the vertical plane in which it is supported by means of the spring 10. The entire load imposed on the beam 8 is, therefore, normally supported by means of the spring 10. A relatively "soft" spring may be employed for this purpose so that when the tractor passes over minor irregularities in the terrain the spring 10 will be effective to absorb substantially all of the shock which would otherwise be transmitted to the seat. When, however, the tractor encounters a substantial obstruction or depression which would otherwise result in a sudden and substantial deflection of the spring 10, the shock absorber comes into play and damps the arcuate movement of the beam 8 as it tends to oscillate in a vertical plane with the shock absorber as its axis of rotation.

I prefer to employ a beam 8 of sufficient strength and stiffness so that it will not be deflected to any substantial extent by the loads imposed thereon during normal use so that, during normal operation, all relative movement between the seat 9 and the frame of the tractor is provided by deflecting the spring 10. A certain degree of resiliency is, of course, present in the beam 8 which comes into play under only those conditions when a very severe and sudden load is placed on the seat 9.

It will be observed that by shifting the bolt 11 to any one of the plurality of holes 12 the effective lever arm of the spring 10 may be adjusted. This adjustment may be employed for the purpose of changing the "softness" of the ride or for the purpose of compensating for substantial differences in the weight of the operator occupying the seat 9.

From the foregoing description it will be observed that I have provided an apparatus capable of satisfying all of the previously enumerated objects of this invention.

Other modes of applying the principle of the invention may be employed, change being made as regards the details described, provided the features stated in any of the following claims or the equivalent of such be employed.

I, therefore, particularly point out and distinctly claim as my invention:

1. In a tractor of the type which includes a rear power take-off mechanism having an exposed shaft as a hazard under the operator, means for protecting and supporting the operator over said shaft including a rearwardly opening housing positionable to cover such shaft, a shock absorber mounted on the tractor and including an element rotatable about a horizontally disposed axis located forwardly of such housing, a rearwardly extending beam having its front end non-rotatably connected to said element, a seat mounted on the rear end of said beam, and a coil spring on said housing disposed between said beam and the aforesaid housing and having its opposite ends respectively fixedly connected to the housing and longitudinally adjustably connected to said beam.

2. In a tractor of the type which includes a rear power take-off mechanism having an exposed shaft as a hazard under the operator, means for protecting and supporting the operator over said shaft including a rearwardly opening housing positionable to cover such shaft, a shock absorber mounted on the tractor and including an element rotatable about a horizontally disposed axis located above and forwardly of such housing, a rearwardly extending beam having its front end non-rotatably connected to said element, a seat mounted on the rear end of said beam, and a coil spring on said housing disposed generally vertically between said beam and the aforesaid housing and having its opposite ends respectively fixedly connected to the housing and longitudinally adjustably connected to said beam.

MERLE C. DETWILER.

REFERENCES CITED

The following references are of record in the file of this patent:

UNITED STATES PATENTS

| Number | Name | Date |
|--------|------|------|
| 817,682 | Werner | Apr. 10, 1906 |
| 1,747,932 | Dufaux | Feb. 18, 1930 |
| 1,864,282 | Sperry | June 21, 1932 |
| 2,115,830 | Thiele | May 3, 1938 |
| 2,334,922 | Gustafson | Nov. 23, 1943 |
| 2,452,280 | Zahller | Oct. 26, 1948 |